Patented Sept. 10, 1935

2,013,662

UNITED STATES PATENT OFFICE 2,013,662

METHOD OF PREPARING DIVINYL ETHER

William A. Lott, Newark, N. J., assignor to E. R. Squibb & Sons, New York, N. Y, a corporation of New York No Drawing. Application March 24, 1934, Serial No. 717,279

7 Claims. (Cl. 260—151)

This invention relates to divinyl ether.

Hitherto divinyl ether has been prepared by the direct interaction of $\beta\beta'$ dichlorethyl ether with an alkali-metal hydroxide. In this process, the reactants being immiscible and the mixture being therefore heterogeneous, the alkali-metal chloride tends to be deposited as a crust on the (fused or granular) alkali, and competing reactions are favored, especially the formation of vinyl chlorethyl ether and acetaldehyde. On the other hand, it has been determined that alcohol is not suitable for use as a solvent, because alcoholic potash reacts with dichlorethyl ether to given certain complex ethers ($C_2H_5OCH_2CH_2OCH_2CH_2Cl$ and
$C_2H_5OCH_2CH_2OCH_2CH_2OC_2H_5$)

but no divinyl ether.

It it the object of this invention to provide a method, free from these disadvantages, whereby divinyl ether may be prepared efficiently.

Essentially the method of this invention comprises interacting a symmetrical dihaloethyl ether and an alkali-metal hydroxide in a glycol, preferably one selected from the group consisting of trimethylene glycol, ethylene glycol, diethylene glycol, propylene glycol, 2,3-butylene glycol, and amylene glycol.

For example, in a mechanically agitated autoclave heated to about 210–240°, 1.6 kg. $\beta\beta'$ dichlorethyl ether may be gradually introduced into a solution of 1.8 kg. potassium hydroxide in 3.6 kg. diethylene glycol. The distillate, passed through a reflux column for returning to the reaction chamber most of the unreacted dichlorethyl ether, is found to contain about 100 g. crude divinyl ether, boiling at 27–70°. Washing with dilute ammonia and then with water, drying over calcium chloride and then with sodium, and further rectifying, yields about 80 g. pure divinyl ether, boiling at 28.3°±0.2°.

It is to be understood that the foregoing example is merely illustrative and by no means limitative of the invention, which may be variously otherwise embodied—as with respect to reactants, solvents, operating conditions, and procedures—within the scope of the appended claims.

I claim:

1. The method of preparing divinyl ether that comprises interacting a symmetrical dihaloethyl ether and an alkali-metal hydroxide in a glycol.

2. The method of preparing divinyl ether that comprises interacting a symmetrical dihaloethyl ether and an alkali-metal hydroxide in a glycol selected from the group consisting of trimethylene glycol, ethylene glycol, diethylene glycol, propylene glycol, 2,3-butylene glycol, and amylene glycol.

3. The method of preparing divinyl ether that comprises interacting a symmetrical dihaloethyl ether and an alkali-metal hydroxide in diethylene glycol.

4. The method of preparing divinyl ether that comprises interacting $\beta\beta'$ dichlorethyl ether and an alkali-metal hydroxide in a glycol.

5. The method of preparing divinyl ether that comprises interacting $\beta'$ dichlorethyl ether and an alkali-metal hydroxide in a glycol selected from the group consisting of trimethylene glycol, ethylene glycol, diethylene glycol, propylene glycol, 2,3-butylene glycol, and amylene glycol.

6. The method of preparing divinyl ether that comprises interacting $\beta\beta'$ dichlorethyl ether and an alkali-metal hydroxide in diethylene glycol.

7. The method of preparing divinyl ether that comprises interacting $\beta\beta'$ dichlorethyl ether and potassium hydroxide in diethylene glycol.

WILLIAM A. LOTT.